(12) United States Patent
Klonowski

(10) Patent No.: US 12,216,759 B2
(45) Date of Patent: *Feb. 4, 2025

(54) DISCRETE PROCESSOR FEATURE BEHAVIOR COLLECTION

(71) Applicant: OPEN TEXT INC., Menlo Park, CA (US)

(72) Inventor: Eric Klonowski, Broomfield, CO (US)

(73) Assignee: OPEN TEXT INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/512,603

(22) Filed: Nov. 17, 2023

(65) Prior Publication Data

US 2024/0086530 A1    Mar. 14, 2024

Related U.S. Application Data

(63) Continuation of application No. 17/187,180, filed on Feb. 26, 2021, now Pat. No. 11,868,468, which is a
(Continued)

(51) Int. Cl.
*G06F 21/55* (2013.01)
*G06F 21/56* (2013.01)

(52) U.S. Cl.
CPC .......... *G06F 21/554* (2013.01); *G06F 21/552* (2013.01); *G06F 21/566* (2013.01); *G06F 2201/865* (2013.01)

(58) Field of Classification Search
CPC .... G06F 21/554; G06F 21/552; G06F 21/566; G06F 2201/865
See application file for complete search history.

(56) References Cited

U.S. PATENT DOCUMENTS

| | | | |
|---|---|---|---|
| 2014/0075567 A1* | 3/2014 | Raleigh | G06Q 30/0283 726/26 |
| 2015/0230108 A1* | 8/2015 | Sridhara | G06F 21/552 455/26.1 |
| 2017/0078922 A1* | 3/2017 | Raleigh | H04L 69/18 |

FOREIGN PATENT DOCUMENTS

| | | | | |
|---|---|---|---|---|
| WO | WO-2011050235 A1 * | 4/2011 | | G06F 21/33 |

OTHER PUBLICATIONS

Eskandari, M. · Khorshidpur, Z. · Hashemi, S.; To Incorporate Sequential Dynamic Features in Malware Detection Engines; 2012 European Intelligence and Security Informatics Conference (2012, pp. 46-52); (Year: 2012).*

(Continued)

*Primary Examiner* — Luu T Pham
*Assistant Examiner* — Chao Wang
(74) *Attorney, Agent, or Firm* — Sprinkle IP Law Group

(57) ABSTRACT

Examples of the present disclosure describe systems and methods for discrete processor feature behavior collection and analysis. In aspects, a monitoring utility may initialize a set of debugging and/or performance monitoring feature sets for a microprocessor. When the microprocessor receives from software content a set of instructions that involves the loading of a set of modules or code segments, the set of modules or code segments may be evaluated by the monitoring utility. The monitoring utility may generate a process trace of the loaded set of modules or code segments. Based on the process trace output, various execution paths may be reconstructed in real-time. The system and/or API calls made by the microprocessor may then be compared to the process trace output to quickly observe the interaction between the software content and the operating system of the microprocessor.

12 Claims, 4 Drawing Sheets

Related U.S. Application Data continuation of application No. 15/636,521, filed on Jun. 28, 2017, now Pat. No. 10,970,388.

(56) References Cited

OTHER PUBLICATIONS

Kenneth Schmitz · Oliver Keszocze · Jurij Schmidt · Daniel Grosse · Rolf Drechsler; Towards Dynamic Execution Environment for System Security Protection Against Hardware Flaws; 2018 IEEE Computer Society Annual Symposium on VLSI (ISVLSI) (2018, pp. 557-562); (Year: 2018).*

El-Ghali, M. · Masri, W.; Intrusion detection using signatures extracted from execution profiles; 2009 ICSE Workshop on Software Engineering for Secure Systems (2009, pp. 17-24); (Year: 2009).*

* cited by examiner

DISCRETE PROCESSOR FEATURE BEHAVIOR COLLECTION

RELATED APPLICATIONS

This application is a continuation of, and claims a benefit of priority under 35 U.S.C. 120 of, U.S. patent application Ser. No. 17/187,180 filed Feb. 26, 2021, issued as U.S. Pat. No. 11,868,468, entitled "Discrete Processor Feature Behavior Collection," which is a continuation of, and claims a benefit of priority under 35 U.S.C. 120 of, U.S. patent application Ser. No. 15/636,521 filed Jun. 28, 2017, entitled "Discrete Processor Feature Behavior Collection," issued as U.S. Pat. No. 10,970,388, both of which are hereby incorporated herein for all purposes.

BACKGROUND

Conventional microprocessors typically comprise various feature sets for monitoring software behavior. These feature sets are configured to identify and report on potential software bugs and performance concerns in problematic code. Generally, such reports are verbose enough to retrace execution paths for processors executing binary code. Such reports, however, are ineffective in determining or analyzing the interaction between software and a system kernel to discern whether the software is potentially malicious.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for discrete processor feature behavior collection and analysis. In aspects, a monitoring utility may initialize a set of debugging and/or performance monitoring feature sets for a microprocessor. When the microprocessor receives a set of instructions that involves the loading of a set of modules or code segments, the set of modules or code segments may be concurrently enumerated and loaded into the environment of the monitoring utility. The monitoring utility may generate a process trace of the loaded set of modules or code segments. Based on the process trace output, various execution paths may be reconstructed in real-time. The system and/or API calls made by the microprocessor may then be compared to the process trace output to quickly observe the interaction between the software content and the operating system of the microprocessor. This observed interaction may be analyzed to determine whether the software content is exhibiting suspicious or malicious behavior.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
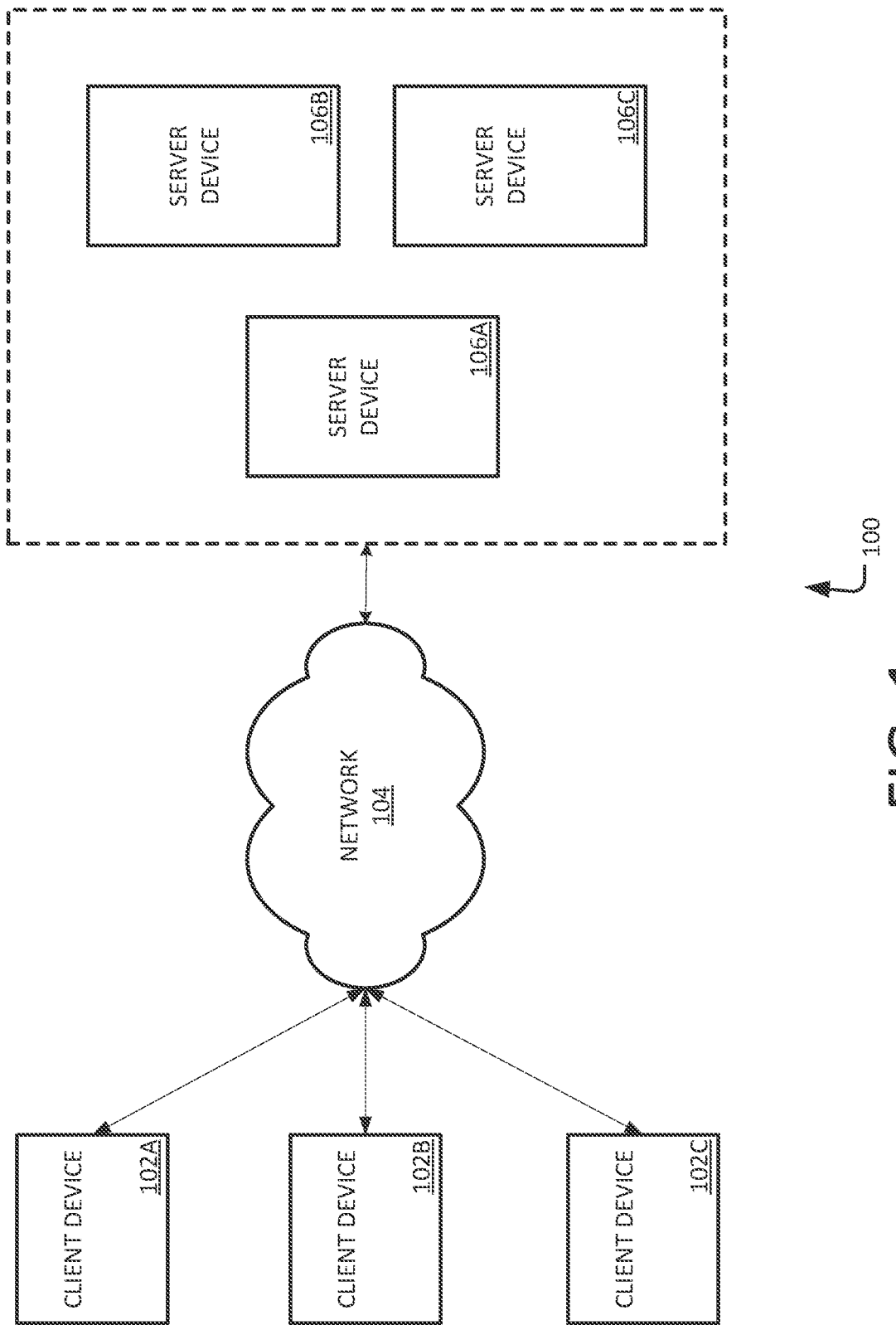
FIG. 1 illustrates an overview of an example system for discrete processor feature behavior collection and analysis as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for discrete processor feature behavior collection and analysis. In aspects, a monitoring utility may be operable to monitor and/or interact with software content interfacing with one or more APIs and/or system components in a computing environment. The monitoring may include initializing a set of debugging and/or performance monitoring feature sets for one or more microprocessors in the computing environment. Initializing the feature sets may include identifying and/or setting a set of parameters or parameter values, identifying data sources to monitor or analyze, identifying specific events or event types, applying one or more filters, activating a monitoring process/system, etc. The feature sets may facilitate the generating and recording of performance data (e.g., process trace information, file accesses, application/service interactions, etc.). In aspects, a microprocessor in the computing environment may receive, or have access to, a task. The task may be associated with a set of instructions for completing, or furthering the completion of, at least a portion of the task or an event associated therewith. In examples, the set of instructions and/or a corresponding set of modules may be loaded in memory, and an initial memory address associated with the execution path of the set of instruction may be loaded.

In some aspects, a task may be received from monitored software content. Examples of software content include operating system files and utilities, programs, applications, executable code, code libraries, driver files, etc. In such aspects, the monitoring utility may identify the set of instructions/modules generated by the monitored software content and loaded in the memory of the computing environment. The monitoring utility may enumerate and load the identified set of instructions/modules in an environment of the monitoring utility. The monitoring utility may then use performance data associated with the monitored software content and the information loaded in the monitoring utility environment to reconstruct task/process execution paths in real-time. In aspects, the execution paths may be used to analyze the interaction between the software content and the one or more APIs/system components in the computing environment. The analysis may include identifying various system and/or interface calls, identifying entry point addresses in the various calls, and comparing such identified data to the performance data. Based on the comparison, a set of observations relating at least in part to the classification of application behavior may be generated. This set of observations may be analyzed to determine whether the software content is exhibiting suspicious or malicious behavior.

Accordingly, the present disclosure provides a plurality of technical benefits including but not limited to: initializing specific debugging/performance monitoring feature sets for a microprocessor; monitoring software content according to the feature sets; generating process tracing information associated with the monitored software content; loading code modules associated with the monitored software content in a test/monitoring environment; using the process tracing information to generate, in real-time, execution paths for the software content; comparing the process tracing information to points of interest in the code modules/execution paths; determining software content behavior using debugging/performance monitoring feature sets; and improved efficiency and quality for applications/services utilizing examples of the present disclosure, among other examples, FIG. 1 illustrates an overview of an example system for discrete processor feature behavior collection and analysis, as described herein. Example system 100 presented is a combination of interdependent components that interact to form an integrated whole for automatic inline detection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (FDA), etc.) and/or any other electronic devices. As an example of a processing device operating environment, refer to the example operating environments depicted in FIG. 4. In other examples, the components of systems disclosed herein may be spread across multiple devices. For instance, input may be entered on a client device and information may be processed or accessed from other devices in a network, such as one or more server devices.

As one example, the system 100 comprises client devices 102A-C, distributed network 104, and distributed server environment comprising server devices 106A-C. One of skill in the art Will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may comprise, or have access to, software content. Examples of software content may include software programs or applications, services, a set of instructions, code modules, or the like. Client devices 102A-C may further comprise, or have access to, one or more debugging and/or performance monitoring utilities. The debugging/performance monitoring utilities may monitor and/or analyze various interactions and instructions generated by the software content. In examples, client devices 102A-C may provide for selecting and/or initializing a feature set to be monitored by the debugging/performance monitoring utilities. The feature set may comprise a set of parameters or parameter values, one or more data sources, events or event types, etc. Initializing the feature sets may include identifying and/or setting the set of parameters or parameter values, identifying data sources to monitor or analyze, identifying specific events or event types, applying one or more filters, activating a monitoring process/system, etc. Initializing the feature sets may also include facilitating the recording of transactions relating to the monitored features of the feature sets. In some aspects, the monitoring may comprise observing requests and/or tasks submitted by the software content to the client devices 102A-C, generating performance data (e.g., process trace information, file access statistics and data, application/service interaction data, etc.), and/or identifying one or more modules or code segments loaded into memory in response to the request/task. In one example, the identified modules/code segments may be loaded into a testing and/or execution environment accessible to the debugging/performance monitoring utilities to reconstruct one or more software content execution paths in real-time. In another example, the debugging/performance monitoring utilities may use the performance data to reconstruct software content execution paths in real-time. In aspects, the software content, the debugging/performance monitoring utilities, and/or the testing and/or execution environment may be stored locally by client devices 102A-C, accessed remotely on server devices 106A-C via distributed network 104, or some combination thereof.

In aspects, client devices 102A-C may enable the software content to interact with a kernel or kernel-level components of client devices 102A-C. A kernel, as used herein, may refer to the central computer program of an operating system. The kernel may manage input/output requests from software content, translate the requests into data processing instructions for a processor or processing unit. Generally, the kernel is loaded into a protected area of memory, which precludes access by software content and lesser components of the operating system. As such, client devices 102A-C may enable software content to interact with the kernel via one or more system calls (e.g., API calls, application binary interface (ABI) calls, syscalls, etc.). In aspects, this interaction may be monitored using the debugging/performance monitoring utilities to identify issues in the software content or issues relating to the execution of the software content. For example, the debugging/performance monitoring utilities may identify one or more points of interest in a software content execution path. The point(s) of interest may be compared to performance data to observe software content interactions with an operating system. The observed interactions may be analyzed to determine whether the software content is exhibiting suspicious or malicious behavior.

Figure 2:
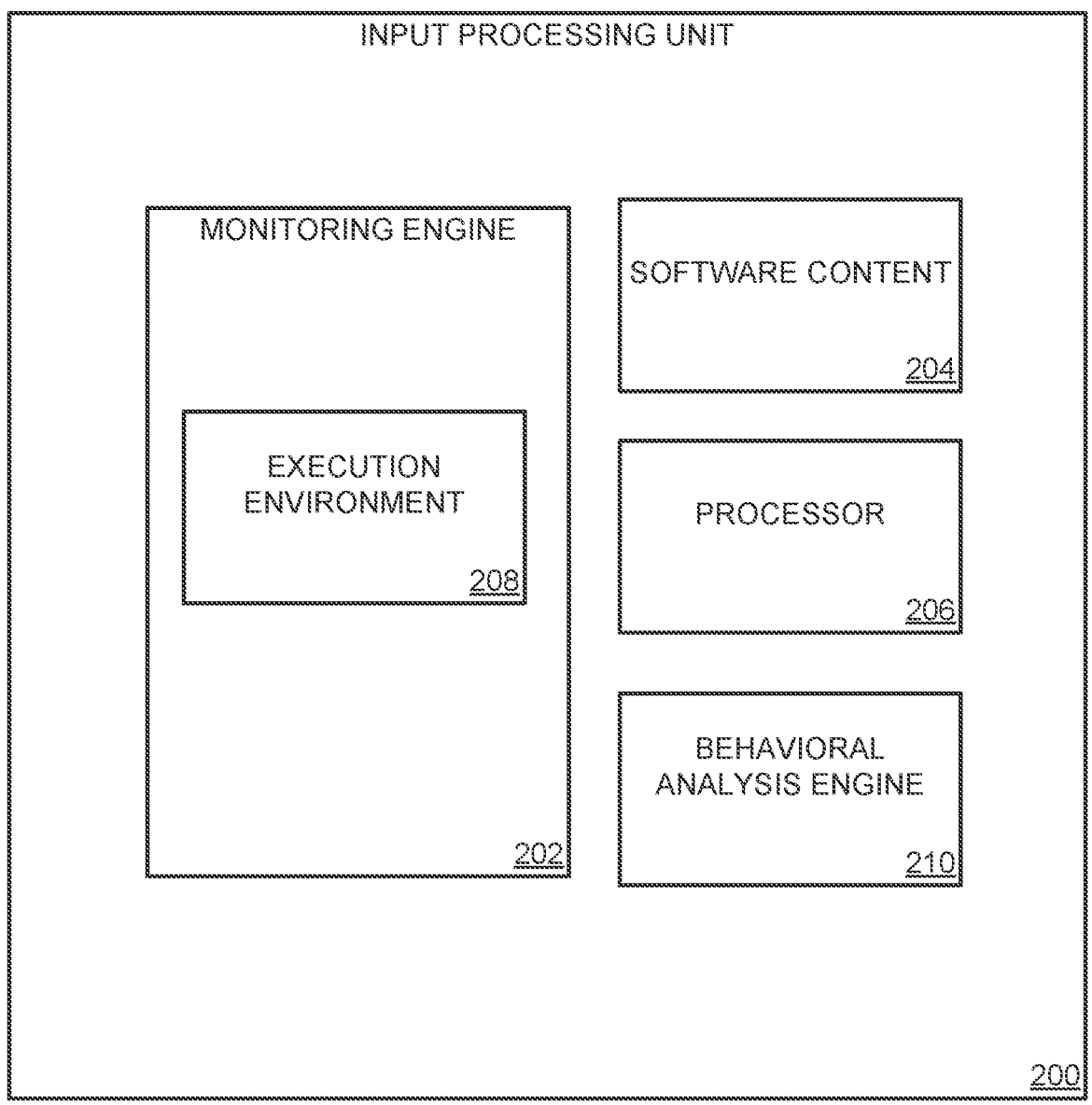
FIG. 2 illustrates an example input processing unit for implementing discrete processor feature behavior collection and analysis as described herein.

FIG. 2 illustrates an overview of an example input processing device 200 for discrete processor feature behavior collection and analysis, as described herein. The discrete processor feature behavior techniques implemented by input processing device 200 may comprise the discrete processor feature behavior techniques and content described in FIG. 1. In alternative examples, a single system (comprising one or more components such as processor and/or memory) may perform processing described in systems 100 and 200, respectively.

With respect to FIG. 2, input processing unit 200 may comprise monitoring engine 202, software content 204, processor 206, execution environment 208, and behavioral analysis engine 210. Monitoring engine 202 may be configured to monitor software content interfacing with one or more components of input processing unit 200. In aspects, monitoring engine 202 may comprise (or have access to) a user interface (not shown), The user interface may, among other actions, provide for specifying one or more aspects of input processing unit 200 to monitor. Such aspects may comprise processing components (e.g., CPU, GPU, etc.), memory locations and components, input/output (I/O) channels and files, etc. Specifying the aspects may include initializing a set of debugging and/or performance monitoring feature sets. In examples, initializing the feature sets may include configuring model-specific registers (MSRs), identifying (and/or setting) parameters or parameter values, identifying data sources to evaluate, selecting software content to monitor, selecting conditions and/or events to monitor or analyze, applying a set of filters, etc. Initializing the feature sets may additionally include facilitating the generation and recordation of performance data (e.g., process trace information, file accesses, application/service interactions, etc.).

Software content 204 may be configured to interact with input processing unit 200. In aspects, software content 204 may generate and/or submit one or more requests to input processing unit 200 via an interface or similar input channels. The software content may represent software programs, application, services, code segments, executable files, etc. The software content may be implemented in a local computing environment, such as input processing unit 200, or in a remote computing environment, such as server devices 106A-C. Upon receiving a request from software content, input processing unit 200 may evaluate the received request to identity one or more jobs and/or tasks needed to complete the request (or a portion thereof). Input processing unit 200 may provide the jobs/tasks to a processing component, such as processor 206. Processor 206 may be configured to process one or more jobs/tasks. In aspects, processing the jobs/tasks may comprise loading a set of instruction or modules associated with a job/task into memory. Processor 206 may then use the loaded set of instruction/modules to make one or more system calls to the kernel (or a kernel component) of input processing unit 200. In some aspects, processor 206 may be monitored by a monitoring utility, such as monitoring engine 202.

Monitoring engine 202 may be further configured to detect the loading of instructions/modules into processing components. In aspects, the monitoring performed by monitoring engine 202 may further comprise detecting when instruction/modules associated with a request from software content are loaded in a processing component, such as processor 206. In response to detecting the loading of the instruction/modules, monitoring engine 202 may evaluate the loaded instructions; modules. In some examples, this evaluating may comprise identifying one or more of loaded instructions/modules (or types thereof) and loading the instructions/modules into an execution environment accessible to monitoring engine 202, such as execution environment 208. Execution environment 208 may be a trusted execution environment that is executed/maintained by monitoring engine 202, or by input processing unit 200. As a trusted execution environment, execution environment 208 may reside in a secure area of one or more processing components. In one example, the secure area may be accessible to high-privileged/trusted components and operations of input processing unit 200 (e.g., secure applications, kernel components, core operating system functionality, etc.), and inaccessible by low-privileged/untrusted components and operations (e.g., remote application/services, untrusted and unknown applications, etc.). Execution environment 208 may comprise (or have access to) utilities for executing, debugging, evaluating, instrumenting, and/or profiling code (e.g., instructions, modules, programs, etc.). For example, execution environment 208 may provide for reconstructing process execution paths for the loaded instructions/modules in real-time. The execution paths may be evaluated with or against performance data of the loaded instructions/modules to identify one or more calls (e.g., API, All, etc.) of interest. The entry point addresses of the calls of interest may be compared to the performance data to observe software content interaction with the operating system of input processing unit 200, Monitoring engine 202 may organize, record and/or store such observations.

Behavioral analysis engine 210 may be configured to analyze one or more observations. Behavioral analysis engine 210 may comprise (or have access to) decision logic, one or more rule sets, or machine learning models. A model, as used herein, may refer to a predictive or statistical language model that may be used to determine a probability distribution over one or more word, character sequences or events, and/or to predict a response value from one or more predictors. In examples, a model may be a rule-based model, a machine-learning regressor, a machine-learning classifier, a neural network, or the like. In aspects, behavioral analysis engine 210 may have access to the monitoring engine 202, components thereof, and/or data therefrom. Behavioral analysis engine 210 may use such access/information to evaluate software content and/or the actions thereof. For example, behavioral analysis engine 210 may receive a list of system calls executed in response to a request by software content. Behavioral analysis engine 210 may process the list of system calls to identify and/or classify behavior signatures that may indicate malicious intent or action. Based on the behavior signatures, behavioral analysis engine 210 may categorize the software content. Categorizing the software content may include comparing the behavior signatures to a list of known malicious or non-malicious content, evaluating categorized data against a rule set or model, comparing categorized data to a threshold value, etc. In aspects, the categorizations may provide for pausing or terminating the operations of the software content, restricting access to input processing unit 200, or suppressing functionality available to the software content.

Having described various systems that may be employed by the aspects disclosed herein, this disclosure will now describe various methods that may be performed by various aspects of the disclosure. In aspects, method 300 may be executed by an example system, such as system 100 of FIG. 1. In examples, method 300 may be executed on a device, such as input processing unit 200, comprising at least one processor configured to store and execute operations, programs or instructions. However, method 300 is not limited to such examples. In other examples, method 300 may be performed on an application or service for identifying anomalous network behavior. In at least one example, method 300 may be executed (e.g., computer-implemented operations) by one or more components of a distributed network, such as a web service/distributed network service (e.g., cloud service).

Figure 3:
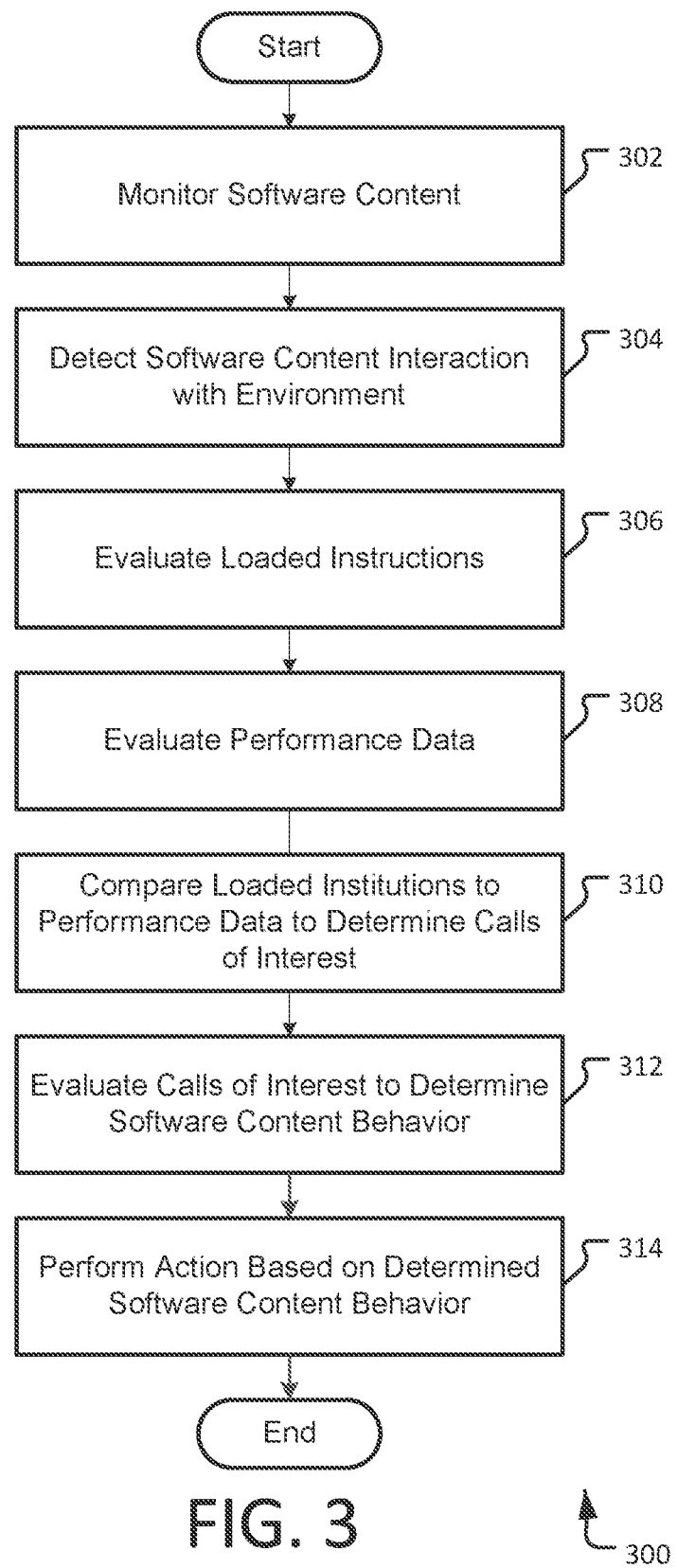
FIG. 3 illustrates an example method for implementing discrete processor feature behavior collection and analysis as described herein.

FIG. 3 illustrates an example method 300 for discrete processor feature behavior collection and analysis, as described herein. Example method 300 begins at operation 302, where software content may be monitored. In aspects, software content may be installed in a local computing environment, such as input processing unit 200, or in a remote computing environment, such as server devices 106A-C. The software content may be configured to interact with (e.g., generate and/or receive requests from) various computing environments and components thereof. Examples of requests include data processing requests (e.g., read/write operations), authorization requests, process execution requests, etc. Monitoring components, such as monitoring engine 202, may be configured to monitor the interactions between the software content and computing environment. In examples, monitoring the interactions may comprise applying one or more monitoring tools and/or debugging utilities to one or more processing components, input/output (I/O) files, or kernel-mode components. The monitoring tools and/or debugging utilities may generate (or cause to be generated) performance data (e.g., process trace information, file access data, application/service interactions, etc.). For example, a set of model specific registers (MSRs) may be configured for one or more processors in a computing environment. An MSR, as used herein, may refer to a process register that controls the general behavior of a processing component (e.g., CPU, GPU, etc.) or a computing device/environment. Generally, an MSR may be used for debugging, program execution tracing, computer performance monitoring, maintaining processing component features, etc. In such an example, the set of MSRs may provide for generating, filtering, and/or outputting process trace information to a physical memory location. The process trace information may be used to determine system call execution information at the system level and/or the process level.

At operation 304, interaction between the software content and computing environment may be detected. In aspects, a monitoring component, such as monitoring engine 202, may detect a request from software content. The request may be directed to the local computing environment and be associated with one or more jobs/tasks, Each of the jobs/tasks may be associated with a set of instructions or code modules invoking one or more processes of the computing environment. Processing components of the computing environment, such as processor 206, may receive/select one or more of the processes. The processing components may then load into memory instructions or code modules associated with performing a received/selected process. In aspects, the monitoring component may detect the loading of the instructions or code modules into memory, or operations associated with loading of the instructions or code modules into memory. The detection may include the use of the monitoring tools and/or debugging utilities described above, or similar process monitoring methods. In some aspects, in response to the detection, the monitoring component may load at least a portion of the detected instructions/code modules into an execution environment, such as execution environment 208. The execution environment may comprise (or have access to) functionality for executing, debugging, evaluating, instrumenting, and/or profiling instructions/code modules.

At operation 306, instructions/code modules may be evaluated. In aspects, the instructions/code modules loaded into the memory of the computing environment and/or the instructions/code modules loaded into the execution environment may be evaluated using one or more evaluation utilities. As an example, the computing environment may apply a set of profiling tools to the instructions/code modules loaded into the memory of the computing environment as the processing components are processing the instructions/code modules. The monitoring component or a separate evaluation component may evaluate the output of the profiling tools. As another example, the monitoring component may apply a set of profiling tools to the instructions/code modules loaded into the execution environment. Such profiling tools may enable loaded instructions/code modules to be parsed to identify export function names, associated memory addresses, applicable offsets, and the like. The parsed data may be used to generate an export function mapping. The profiling tools may additionally provide for the acquisition/use of relevant symbols (e.g., global/local variables, function names, entry point addresses, line numbers, etc.) and/or symbol files. For instance, the monitoring component may have access to a symbol data store comprising one or more symbol files. The monitoring component may evaluate the symbol data store to determine symbols and/or symbol files relevant to the loaded instructions/code modules. The evaluation may include the use of search tools, expression matching, rule sets, etc. When one or more symbols or symbol files is determined to be relevant, the monitoring component may retrieve the symbols/symbol files. The monitoring component may extract one or more symbols and corresponding offsets from the retrieved symbols/symbol files to generate a symbol mapping. The symbol mapping may be appended to an export function mapping.

At operation 308, performance data may be evaluated. In aspects, performance data generated by the monitoring tools and/or debugging utilities (as described above) may be evaluated using one or more evaluation utilities. As an example, the computing environment and/or the monitoring component may apply a set of profiling tools to the performance data to extract one or more memory addresses. The set of profiling tools may be, or comprise a subset of, the set of profiling tools described above. Extracting the one or more memory addresses may comprise detecting addresses, identifying specified addresses, determining addresses of interest, or the like. The computing environment may use the one or more memory addresses to identify calls (e.g., system calls, function calls, etc.) in the instructions/code modules. In such an example, identifying the calls may include focusing on calls that are outside the image region of a set of instructions/code module. As another example, the monitoring component may apply the performance data to a profiling tool/model. The profiling tool/model may use the execution environment to reconstruct execution paths for the corresponding instructions/code modules in real-time. The execution paths may be evaluated to identity function names, associated memory addresses, applicable offsets, and the like.

At operation 310, performance data may be compared to an export function mapping. In aspects, calls identified in the evaluated performance data may be compared to the calls identified in the export function mapping. The comparison may identify (or be used to identify) one or more calls of interest in a set of instructions code modules. The comparison may include applying one or more logic sets, rule sets, or decision models to the calls in the performance data and the calls in the export function mapping. In examples, calls of interest may include calls that cause (e.g., untrusted) software content to interact with the kernel of a computing environment, calls originating from an API, ABI, or another interface (as opposed to abstracted kernel-mode calls), calls identified on a white list or black list of known calls, etc.

At operation 312, one or more calls of interest may be evaluated. In aspects, an analysis component, such as behavioral analysis engine 210, may have access to the identified calls of interest. The analysis component may analyze the calls to identify or generate one or more behavior signatures. Analyzing the calls may include parsing the calls to identify one or more features (e.g., terms, keywords, values, instructions, etc.) and related data, and using the parsed data to classify the calls as one or more categories or types. In examples, generating behavior signatures may comprise evaluating the calls against a lookup table, providing the calls to a behavior algorithm/model, generating behavioral metrics, or the like. The behavior signatures may be used to identify potentially malicious software content or instructions. For example, software content may submit a set of instructions corresponding to a malicious injection of code into another process. The code injection may be represented by the instruction: NtAllocateVirtualMemory→AltWriteVirtualMemory→NtQueueApcThread. The analysis component may parse the instruction to identify the terms "NtAllocateVirtualMernory," "NtWriteVirtualMernory," and "NtQueueApcThread." Based on the term content, it may be determined that "NtAllocateVirtualMemory" and "NtWriteVirtualMemory" refer to memory routines and "NtQueueApcThread" refers to a queue routine. The analysis component may then classify each routine accordingly. In at least one example, the analysis component may also analyze the instruction as a whole. The analysis may abstract the instruction into a broader class of behavior (e.g., code injection).

At operation 314, actions may be performed based on determined software behavior. In aspects, software behavioral data may be used to effect one or more actions associated with monitored software content. Such actions may be remedial, informative and/or preventative. For example, an evaluation of the above code injection instruction (e.g., NtAllocateVirtualMernory→NtWriteVirtualMemory→NtQueueApcThread) may cause the routines comprised in the instructions to be classified into one or more groups (e.g., "memory" operations and "queue" operations). In a particular example, the groups may be associated with one or more evaluation utilities, such as virus software, debugging utilities, code analysis tools, etc. The analysis utilities may be general utilities that could be used to evaluate the contents (e.g., scripts, function, routines, etc.) of several of the groups, or the analysis utilities may be group-specific. The analysis utilities may be used to identify potentially malicious software content or instructions. When malicious software content or instructions are determined or identified, the analysis utilities may communicate such a determination to a remediation component. In examples, the remediation component may be a component of input processing device 200 or component accessible to input processing device 200. The remediation component may use the communicated determination to effect an action associated with the analyzed software content. Such actions may include pausing or terminating the operations of the software content, restricting access to the computing environment (or components thereof), restricting access to functions or libraries, suppressing functionality available to the software content, generating behavioral reports, issuing notifications or warnings, providing analysis to alternate components accessible to the computing environment, etc.

Figure 4:
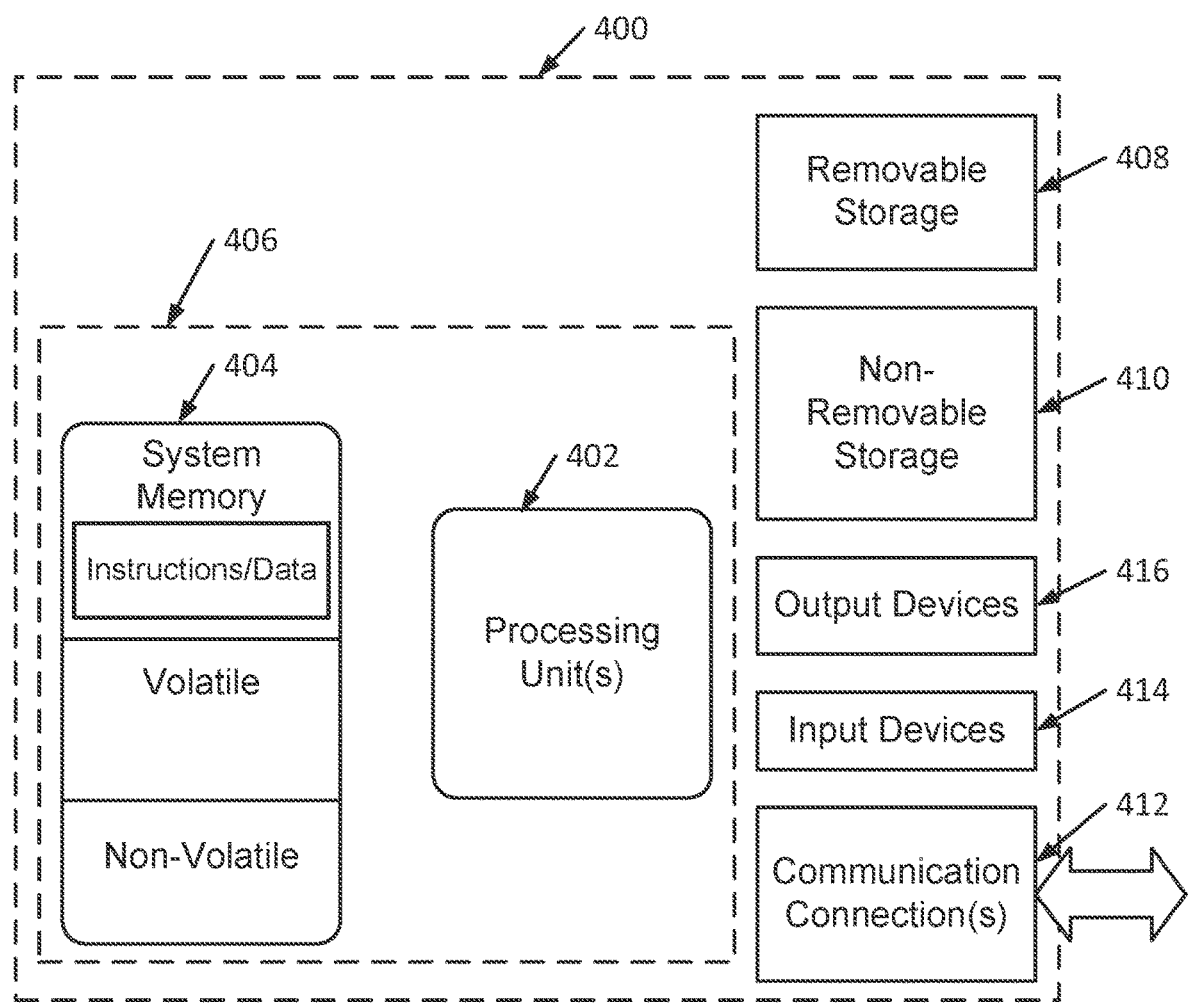
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure provide a system comprising: at least one processor; and memory coupled to the at least one processor, the memory comprising computer executable instructions that, when executed by the at least one processor, performs a method for discrete processor feature behavior collection and analysis, the method comprising: monitoring software content; detecting interaction between the software content and the system, wherein the interaction relates to loading into memory a set of instructions, and wherein the interaction generates performance data; evaluating the loaded set of instructions to identify a first set of calls; evaluating the performance data to identify a second set of calls; comparing the first set of calls to the second set of calls to identify a third set of calls, wherein the third set of calls represent calls of interest; and evaluating the third set of calls to categorize the software content. In some examples, the method further comprises initializing one or more performance monitoring feature sets to be monitored by the one or more processors, wherein the initializing comprises at least one of: identifying a set of parameters or parameter values, identifying data sources to monitor, identifying specific events to monitor, and applying one or more filters to the one or more processors. In some examples, monitoring the software content comprises applying one or more monitoring tools to at least one of: the one or more processors, input/output (I/O) files, and kennel-mode components. In some examples, in response to detecting the interaction, the set of instructions is loaded into an execution environment, wherein the execution environment comprises functionality for at least one of: executing the set of instructions, debugging the set of instructions, and profiling the set of instructions. In some examples, the performance data comprises trace information for a process associated with the detected interaction. In some examples, evaluating the loaded set of instructions comprises: parsing the set of instructions to identify at least one of: function names, memory addresses, and corresponding offsets; and using the parsed set of instructions to generate a function mapping. In some examples, evaluating the loaded set of instructions further comprises: acquiring one or more symbols and corresponding offsets related to the function mapping to generate a symbol mapping; and appending the symbol mapping to the function mapping. In some examples, evaluating the performance data comprises: using the performance data to reconstruct, in real-time, one or more execution paths for the set of instructions; and evaluating the one or more execution paths to identify at least one of: function names, memory addresses, and corresponding offsets. In some examples, the calls of interest correspond to at least one of: calls causing the software content to interact with a kernel of the system, calls originating from an API, and calls identified on a list of known calls. In some examples, evaluating the third set of calls comprises generating one or more behavior signatures, wherein the one or more behavior signatures identify behavior of the software content. In some examples, the one or more behavior signatures are used to effect an action selected from the group consisting of: terminating operations of the software content, restricting access to the system, suppressing functionality available to the software content, generating behavioral reports, and issuing notifications. In some examples, categorizing the software content comprises at least one of: comparing the one or more behavior signatures to a list of known malicious content, evaluating the one or more behavior signatures against a rule set or model, and comparing the third set of calls to one or more threshold values.

Aspects of the present disclosure further provide a method for discrete processor feature behavior collection and analysis, the method comprising: monitoring software content; detecting interaction between the software content and the system, wherein the interaction relates to loading into memory a set of instructions, and wherein the interaction generates performance data; evaluating the loaded set of instructions to identify a first set of calls; evaluating the performance data to identity a second set of calls; comparing the first set of calls to the second set of calls to identify a third set of calls, wherein the third set of calls represent calls of interest; and evaluating the third set of calls to categorize the software content. In some examples, the method further comprises: identifying one or more performance monitoring features associated with a processing component; identifying a set of model specific registers related to the one or more performance monitoring features; and initializing the set of model specific registers for the processing component. In some examples, the set of model specific registers is operable to perform at least action selected from the group consisting of: debugging software content, tracing software content execution, and monitoring performance of the processing component. In some examples, the interaction corresponds to one or more tasks submitted by the software content to a computing environment comprising the processing component. In some examples, in response to detecting the interaction, the set of instructions is enumerated and evaluated using one or more monitoring components. In some examples, evaluating the performance data comprises: using the performance data to reconstruct, in real-time, one or more execution paths for the set of instructions; and evaluating the one or more execution paths to identify at least one of: function names, memory addresses, and corresponding offsets. In some examples, the calls of interest correspond to at least one of: calls causing the software content to interact with a kernel of the system, calls originating from an API, and calls identified on a list of known calls.

Aspects of the present disclosure further provide a computer-readable storage medium encoding computer executable instructions which, when executed by at least one processor, performs a method for discrete processor feature behavior collection and analysis, the method comprising: monitoring software content; detecting interaction between the software content and the system, wherein the interaction relates to loading into memory a set of instructions, and wherein the interaction generates performance data; evaluating the loaded set of instructions to identify a first set of calls; evaluating the performance data to identify a second set of calls; comparing the first set of calls to the second set of calls to identify a third set of calls, wherein the third set of calls represent calls of interest; and evaluating the third set of calls to categorize the software content.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   monitoring, by a monitor engine including a secure execution environment, interactions between software content and a computing environment, wherein the monitor engine executes in the computing environment and maintains a secure execution environment in a secure area of the computing environment such that the secure execution environment is inaccessible to any untrusted components or operations;
   detecting, by the monitor engine, storing of instructions into memory of the computing environment based on an address of a memory access;
   evaluating, by the monitor engine, instructions of the software content, wherein evaluating the instructions comprises evaluating the instructions to determine performance data associated with the software content using one or more profiling tools or models to evaluate at least one aspect of the instructions to determine the performance data;
   identifying, by the monitor engine using the secure execution environment, calls of interest in the instructions by classifying the calls of interest based on the performance data and evaluating the calls of interest to generate behavioral signatures;
   applying, by the monitor engine, behavioral signatures to determine that software content is malicious; and
   based on the determined malicious software content, taking a remedial action including isolating the software content.

2. The method of claim 1, wherein the computing environment comprises a local computing environment of a remote environment.

3. The method of claim 1, wherein the monitor engine is associated with an operating system kernel.

4. The method of claim 1, wherein the performance data includes on global or local variables, function names, entry point addresses, or line numbers.

5. A system, comprising:
   a processor;
   a memory coupled to the processor, the memory comprising computer executable instructions for:
   monitoring, by a monitor engine including a secure execution environment, interactions between software content and a computing environment, wherein the monitor engine executes in the computing environment and maintains a secure execution environment in a secure area of the computing environment such that the secure execution environment is inaccessible to any untrusted components or operations;
   detecting, by the monitor engine, storing of instructions into memory of the computing environment based on an address of a memory access;
   evaluating, by the monitor engine, instructions of the software content, wherein evaluating the instructions comprises evaluating the instructions to determine performance data associated with the software content using one or more profiling tools or models to evaluate at least one aspect of the instructions to determine the performance data;
   identifying, by the monitor engine using the secure execution environment, calls of interest in the instructions by classifying the calls of interest based on the performance data and evaluating the calls of interest to generate behavioral signatures;
   applying, by the monitor engine, behavioral signatures to determine that software content is malicious; and
   based on the determined malicious software content, taking a remedial action including isolating the software content.

6. The system of claim 5, wherein the computing environment comprises a local computing environment of a remote environment.

7. The system of claim 5, wherein the monitor engine is associated with an operating system kernel.

8. The system of claim 5, wherein the performance data includes on global or local variables, function names, entry point addresses, or line numbers.

9. A non-transitory computer readable medium, comprising instructions for:
   monitoring, by a monitor engine including a secure execution environment, interactions between software content and a computing environment, wherein the monitor engine executes in the computing environment and maintains a secure execution environment in a secure area of the computing environment such that the secure execution environment is inaccessible to any untrusted components or operations;
   detecting, by the monitor engine, storing of instructions into memory of the computing environment based on an address of a memory access;
   evaluating, by the monitor engine, instructions of the software content, wherein evaluating the instructions comprises evaluating the instructions to determine performance data associated with the software content using one or more profiling tools or models to evaluate at least one aspect of the instructions to determine the performance data;
   identifying, by the monitor engine using the secure execution environment, calls of interest in the instructions by classifying the calls of interest based on the performance data and evaluating the calls of interest to generate behavioral signatures;
   applying, by the monitor engine, behavioral signatures to determine that software content is malicious; and based on the determined malicious software content, taking a remedial action including isolating the software content.

10. The non-transitory computer readable medium of claim 9, wherein the computing environment comprises a local computing environment of a remote environment.

11. The non-transitory computer readable medium of claim 9, wherein the monitor engine is associated with an operating system kernel.

12. The non-transitory computer readable medium of claim 9, wherein the performance data includes on global or local variables, function names, entry point addresses, or line numbers.

* * * * *